3,148,950
PROCESS OF TREATING METAL SULFATES
Jarrell B. Mugg, Vancouver, Wash., assignor to Crown-Zellerbach Corporation, San Francisco, Calif., a corporation of Nevada
No Drawing. Filed Feb. 27, 1961, Ser. No. 91,584
16 Claims. (Cl. 23—224)

This invention relates to a process of treating metal sulfates. More particularly, the present invention relates to a process for converting metal sulfates to elemental sulfur and an oxide or a carbonate of the corresponding metal.

Heretofore, the production of elemental sulfur has been limited to the use of deposits of the native elements from which sulfur is recovered by flotation, distillation, or solvent extraction procedures. Also, other sources, such as sour natural gas and refinery gas have been utilized to remove hydrogen sulfide therefrom and convert it to sulfur. Pyrites and other sulfide ores have also been treated to recover elemental sulfur by direct smelting to produce $SO_2$ which is further reacted to form elemental sulfur (Orkla process). Another known process consists of heating pyrites in the absence of oxygen whereby elemental sulfur is produced (the Noranda process).

Attempts have also been made to produce elemental sulfur from metal sulfates. However such attempts have not been entirely successful on a commercial scale. In one of such processes, gypsum (calcium sulfate) is heated with carbon in a substantially neutral atmosphere using a specific amount of carbon for each molecule of calcium sulfate to produce sulfur dioxide and calcium oxide. The main reason why large quantities of metal sulfates have not been utilized thus far in the manufacture of sulfur is that metal sulfates are extremely difficult to break down into elemental sulfur and corresponding metal oxides or carbonates.

Accordingly, the present invention has for its general object the provision of a new process wherein metal sulfates may be converted simply and directly into useful inorganic chemicals having a wide variety of commercial applications.

It is another object of this invention to provide a process for treating metal sulfates to produce elemental sulfur and corresponding metal oxides or carbonates, which process is easy and economical to operate.

Other objects and advantages of the present process will become apparent as the invention is hereinafter more fully described.

To the accomplishment of the foregoing and related ends, this invention then comprises the features hereinafter fully described and particularly pointed out in the claims. The following disclosure sets forth in detail certain illustrative embodiments of the invention in which the principle of the invention may be employed.

Broadly stated, the present invention comprises a process for treating a metal sulfate by admixing such sulfate with carbon and reacting the resulting mixture with hot carbon dioxide-containing gas for a time sufficient to form elemental sulfur and a corresponding metal carbonate or oxide. Thereafter elemental sulfur is withdrawn from the reaction zone and recovered, while the recovery of the residual metal compound is simply effected by discharging it from the reaction zone.

The present procedure is applicable to a large number of metal sulfates. Suitable sulfates include those of such metals as calcium, magnesium, barium, strontium, nickel, thorium, lead, chromium, vanadium, cerium, titanium, aluminum, potassium, cadmium, cobalt, sodium, zinc, and lithium. Also, alkaline earth metal sulfates, particularly those of calcium and magnesium derived from spent sulfite liquors, may be employed as a starting material for the presently described process. Such materials may be obtained by combustion of sulfite spent liquor to the point where an inorganic residue substantially devoid of carbonaceous materials, is obtained. In certain cases, where calcium or magnesium sulfite spent liquor is incinerated, the resulting solid residue may contain a small proportion of carbonaceous materials wherein a carbon to sulfur molar ratio is less than 2:1, respectively.

In accordance with the present invention, any of the hereinabove mentioned metal sulfates may first be comminuted to a finely divided form and admixed in a suitable mixing apparatus with a finely divided carbonaceous material, such as coke. The resulting finely divided mixture must contain sufficient carbonaceous material to carry out the reaction to substantial completion. A molar ratio of carbon to sulfur in said mixture of at least 2:1, and preferably from 2.2:1 to 2.5:1, respectively, is generally satisfactory. Higher carbon/sulfur ratios may be employed, however no beneficial effects are obtained.

While I do not wish to be bound by a theory as to how the reaction products of this invention are produced, I believe that the correct explanation expressed equationwise is substantially as follows:

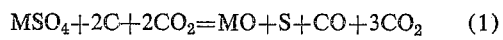

wherein M represents any of the foregoing or other suitable metals.

The foregoing equations show that in order to produce elemental sulfur and a metal oxide or carbonate, a ratio of at least 2 moles of carbon to 1 mole of sulfur in the metal sulfate is required.

The mixture containing a metal sulfate and a carbonaceous material is introduced into a suitable reaction zone such as a fluidized bed reactor in which fluidization is effected by passing therethrough a hot carbon dioxide-containing gas at a rate sufficient to convert substantially all of the metal sulfate to elemental sulfur. In general, a flow rate of the carbon dioxide containing gas may vary from approximately 20 to 50 standard cubic feet per minute per square foot of bed area, depending on the design of the reaction apparatus.

The hot gas which is introduced into the reaction zone should contain preferably at least 15% of $CO_2$ by volume. Such gas may be produced by burning in a suitable combustion apparatus a carbonaceous fuel, such as fuel oil, coke, etc. in the presence of a free oxygen-containing gas, such as air.

The temperature in the reaction zone may vary to a certain extent depending on the nature of the metal sulfate employed. In general, it should be in excess of about 1200° F., preferably in excess of 1400° F. but below the melting point of the metal sulfate employed.

During the reaction, gaseous reaction products are formed. These products contain a mixture of vaporized elemental sulfur together with carbon dioxide, carbon monoxide and nitrogen. The gaseous mixture is cooled in a suitable cooling apparatus to a temperature below approximately 830° F., whereby elemental sulfur is condensed and separated by any suitable means from the non-condensible gases. The condensed sulfur may be solidified in accordance with conventional practice.

The metal compound residue remaining in the reaction zone may contain a metal carbonate or a metal oxide or a mixture thereof depending on the nature of the metal sulfate employed and the reaction temperature. As is well known, the formation of a metal carbonate is encouraged when a relatively low temperature is maintained in the reaction zone. Conversely, a metal oxide will be produced at a higher temperatue range, particularly above the decomposition temperature of a given metal carbonate. The metal compound, i.e. an oxide or a carbonate, produced in the foregoing manner is discharged from the reaction zone, cooled and recovered for storage or shipment.

In order to disclose the nature of this invention still more clearly, the following illustrative examples are given hereinbelow.

*Example 1*

This example illustrates the presently described process for the recovery of elemental sulfur and a metal oxide.

Calcined gypsum (calcium sulfate) is passed through crushing rolls and comminuted to a fine particle size passing through a 10-mesh Tyler screen. Oversized particles are returned to the crusher. The accepted gypsum particles are introduced into a mixer together with powdered coke of the same particle size as that of gypsum. The respective amounts of the two materials are measured in order to insure that a mixture having a molar ratio of 2.2 parts of carbon to 1 part of sulfur is obtained. The resulting mixture is introduced into a fluidized bed reactor maintained at a temperature of 1600° F. The fluidization is effected by passing a hot gas through a bed at the rate of 36 standard cubic feet per minute per square foot of bed area. The hot gas contains 16% carbon dioxide by volume and is produced by the combustion of powdered coke in a burner located beneath the fluidized bed. The carbon dioxide-containing gas which is introduced into the reaction zone at a temperature of about 2500° F. reacts with the calcium sulfate and carbon to produce calcium oxide and a stream of gas containing elemental sulfur vapor.

The stream of gas leaving the reaction zone through an outlet contains 5% of elemental sulfur vapor by volume. This stream of gas is cooled to about 900° F. in a heat exchanger. Substantially dry air which is directed to the burner is employed as the coolant and is thereby preheated. The stream passes next through a steam-heated condenser maintained at a temperature of 300° F. in which sulfur vapor is condensed. The non-condensible gases containing primarily $CO_2$, $CO$ and $N$ are exhausted to the atmosphere. The condensed liquefied sulfur is discharged from the condenser, allowed to solidify, comminuted to a desired particle size and stored ready for shipment.

The calcium oxide is discharged from the reaction zone, cooled in a water-jacketed rotary cooler and stored ready for shipment.

The output of the reactor is 20 lbs. of calcum oxide and 11 lbs. of elemental sulfur per hour per square foot of bed area.

*Example 2*

This example illustrates the present process wherein elemental sulfur and a metal carbonate are produced.

The procedure of Example 1 is substantially followed, except that barite (barium sulfate) is employed instead of gypsum. The reaction is effectuated at a temperature of about 1500° F. The reaction products are elemental sulfur and barium carbonate. The output of the reactor is 11 lbs. of elemental sulfur and 70 lbs. of barium carbonate per hour per square foot of bed area.

*Example 3*

The procedure of Example 1 is repeated, except that magnesium sulfate is employed instead of gypsum. The reaction products are elemental sulfur and magnesium oxide. The output of the reactor is 11 lbs. of elemental sulfur and 14 lbs. of magnesium oxide per hour per square foot of bed area.

*Example 4*

The procedure of Example 1 is repeated, except that nickel sulfate is employed instead of gypsum and the temperature in the reaction zone is maintained at 1500° F. The reaction products are elemental sulfur and nickel oxide; their output is 11 lbs. and 26 lbs., respectively, per hour per square foot of bed area.

*Example 5*

The procedure of Example 1 is followed, except that strontium sulfate is employed instead of gypsum and the reaction is carried out at a temperature of about 1400° F. The reaction products are elemental sulfur and strontium carbonate; their output is 11 lbs. and 53 lbs., respectively, per hour per square foot of bed area.

Substantially the same reaction conditions as specified in Examples 1 to 5 can be employed for the treatment of any other metal sulfates enumerated hereinabove to produce elemental sulfur and corresponding metal oxides or carbonates in the form ready for usual commercial purposes.

As is well known, elemental sulfur is suitable for use in the manufacture of sulfuric acid, for agricultural purposes, etc. The resulting metal oxides or carbonates are useful per se in numerous industrial applications or as intermediates in the production of other industrial chemical products.

Accordingly, it will be apparent that by the present invention I have provided a process for treating metal sulfates to produce elemental sulfur and corresponding metal oxides or carbonates. The process of this invention can be carried out readily and economically on a large commercial scale. The reaction involving the conversion of metal sulfates goes to substantial completion and thus provides a practical means of producing commercially valuable chemical products from metal sulfates.

It will be understood by those skilled in the art that reasonable variations and modifications are possible within the scope of the foregoing disclosure and the appended claims.

I claim:

1. A process of producing elemental sulfur from a metal sulfate which comprises preparing a finely divided mixture of said sulfate and carbon, wherein the molar ratio of carbon to sulfur in said mixture is at least 2:1, respectively, passing through the resulting mixture in a reaction zone a hot carbon dioxide-containing gas at an elevated temperature and at a rate sufficient to insure an intimate contact between the carbon dioxide and said mixture to react with and convert substantially all of said sulfate to elemental sulfur and a compound selected from the group consisting of corresponding metal oxides and carbonates, and separating said elemental sulfur from said compound.

2. The process of claim 1 wherein said metal is calcium.

3. The process of claim 1 wherein said metal is barium.

4. The process of claim 1 wherein said metal is magnesium.

5. The process of claim 1 wherein said metal is strontium.

6. The process of claim 1 wherein said metal is nickel.

7. The process of claim 1 wherein said carbon dioxide-containing gas contains at least 15% $CO_2$ by volume.

8. The process of claim 1 wherein said mixture is reacted at a temperature in excess of about 1200° F. but below the melting point of said sulfate.

9. The process of claim 1 wherein said mixture is reacted at a temperature between about 1400° F. and the melting point of said sulfate.

10. The process of claim 1 wherein the molar ratio of carbon to sulfur in said mixture is from 2.2:1 to 2.5:1, respectively.

11. The process of claim 1 including the steps of withdrawing the elemental sulfur from the reaction zone together with gaseous reaction products, cooling the mixture of the sulfur and said gaseous reaction products to condense the sulfur and isolating the condensed sulfur from said gaseous reaction products.

12. The process of claim 1 wherein said compound is a metal oxide.

13. The process of claim 1 wherein said compound is a metal carbonate.

14. The process of producing elemental sulfur from a metal sulfate which comprises the steps of preparing a finely divided mixture of said sulfate and carbon, insuring that the molar ratio of carbon to sulfur therein is at least 2:1, passing through the resulting mixture in a reaction zone a hot gas containing at least 15% $CO_2$ by volume at a temperature between about 1200° F. and the melting point of said sulfate at a rate sufficient to insure an intimate contact between the carbon dioxide and said mixture to react with and convert substantially all of said sulfate to a compound selected from the group consisting of corresponding metal oxides and carbonates and a stream of gas containing vaporized elemental sulfur, withdrawing said stream of gas from said reaction zone, cooling said stream of gas to condense the sulfur, separating the condensed sulfur from said stream of gas, and recovering said compound and the elemental sulfur.

15. The process of claim 14 wherein said compound is a metal oxide.

16. The process of claim 14 wherein said compound is a metal carbonate.

References Cited in the file of this patent

UNITED STATES PATENTS

| | | |
|---|---|---|
| 2,232,099 | De Jahn | Feb. 18, 1941 |
| 2,425,740 | Horn | Aug. 19, 1947 |
| 2,863,726 | Kamlet | Dec. 9, 1958 |

OTHER REFERENCES

Mellor: "Comprehensive Treatise on Inorganic and Theoretical Chemistry," 1930, vol. 10, page 19.